United States Patent [19]

Kaku et al.

[11] Patent Number: 4,839,738
[45] Date of Patent: Jun. 13, 1989

[54] APPARATUS FOR DECODING FACSIMILE CODED DATA TO IMAGE DATA WITH CODING AND REFERENCE LINE WINDOWING AND COLOR CHANGE DETECTION

[75] Inventors: Shinkyo Kaku, Los Gatos; Chung-Li Yu, San Jose, both of Calif.

[73] Assignee: Advanced Micro Devices, Inc., Sunnyvale, Calif.

[21] Appl. No.: 41,261

[22] Filed: Apr. 22, 1987

[51] Int. Cl.⁴ .............................................. H04N 1/419
[52] U.S. Cl. ................................. 358/261.2; 358/260; 358/261.4
[58] Field of Search ............... 358/261, 133, 135, 136, 358/260

[56] References Cited

U.S. PATENT DOCUMENTS

| | | | |
|---|---|---|---|
| 4,245,257 | 1/1981 | Yamazaki et al. | 358/261 |
| 4,486,784 | 12/1984 | Abraham et al. | 358/261 |
| 4,509,194 | 4/1985 | Harrington | 358/261 |
| 4,533,956 | 8/1985 | Fedde | 358/261 |
| 4,542,413 | 9/1985 | Rallapalli et al. | 358/261 |
| 4,558,371 | 12/1985 | Rallapalli et al. | 358/261 |
| 4,562,484 | 12/1985 | Rallapalli et al. | 358/261 |
| 4,590,521 | 5/1986 | Rallapalli et al. | 358/261 |
| 4,716,471 | 12/1987 | Yokomizo | 358/261.4 |
| 4,760,459 | 7/1988 | Sato et al. | 358/260 |
| 4,760,461 | 7/1988 | Sato | 358/261.4 |

FOREIGN PATENT DOCUMENTS

| | | | |
|---|---|---|---|
| 60-194671 | 10/1985 | Japan | 358/261 |
| 60-194672 | 10/1985 | Japan | 358/261 |
| 2159364 | 11/1985 | United Kingdom | 358/261 |

OTHER PUBLICATIONS

P. A. Franaszek, "Sequence-State Methods for Run-Length-Limited Coding", IBM Journal of Research Development, Jul. 1970, pp. 376-383.

*Primary Examiner*—James J. Groody, Jr.
*Assistant Examiner*—Randall S. Svihla
*Attorney, Agent, or Firm*—Fliesler, Dubb, Meyer & Lovejoy

[57] ABSTRACT

A decoder receives a series of input words defining variable length facsimile codes and generates pixel data to form a facsimile of an image. A code windowing apparatus selects a variable length code from the received series of words. A decoding ROM generates intermediate codes and code window control signals in response to the selected variable length codes. A reference windowing apparatus connected to receive pixel data generated during the decode of a previous scan line of the facsimile, selects a reference window of pixel data from a previous scan line. A color change detector indentifies a position of a color change picture element in the reference window. Output pixel data is generated in response to the intermediate codes and the position of the color change picture element in the reference window.

19 Claims, 11 Drawing Sheets

APPARATUS FOR DECODING FACSIMILE CODED DATA TO IMAGE DATA WITH CODING AND REFERENCE LINE WINDOWING AND COLOR CHANGE DETECTION

CROSS-REFERENCE TO RELATED APPLICATION

The present application is related to a U.S. Patent application filed earlier, entitled APPARATUS FOR TWO-DIMENSIONALLY ENCODING IMAGE DATA TO FACSIMILE CODED DATA invented by Shinkyo Kaku and Chung-Li Yu, Ser. No. 07/029,832, filed Mar. 24, 1987. This related application was owned at the time of invention and is currently owned by the same assignee as the present application and is incorporated by reference as is fully set forth herein.

BACKGROUND OF THE INVENTION

1. Field of the Invention

The present invention relates to decoding apparatus for expanding coded data to data representing picture elements of a facsimile of an image for communication or display.

Facsimiles of graphic images are encoded in a variety of contexts to compress the amount of storage space or the bandwidth for communication needed for the facsimiles. In order to display the coded data, the codes must be converted to digital image information. Typical systems which have used this encoding/decoding process include facsimile machines, video workstations, electronic mail systems and storage and retrieval systems.

A digital facsimile system, in which the preferred embodiment of the present invention is implemented, is an information communication machine by which picture information is transmitted from one location to another location over a communication link such as a telephone line. Typically, in facsimile systems, a scanner generates a facsimile of a graphic image by scanning the original image, such as on a document, on a line-by-line basis, each line including a large number of picture elements. The generated facsimile is then encoded by either a one-dimensional or a two-dimensional coding scheme to compress the image data to reduce the bandwidth or transmission time required for communicating the facsimile. the compressed data is then transmitted over communication links to remote facsimile machines. The remote facsimile machine decodes the compressed data to regenerate the facsimile and reproduces the original graphic image.

One-dimensional coding schemes are based upon the correlation of picture elements along a given scan line in the horizontal direction, whereas two-dimensional coding schemes are based upon a vertical correlation between successive scan lines in addition to the horizontal correlation. Both one-dimensional and two-dimensional schemes have been standardized by the International Telegraph and Telephone Consultative Committee (CCITT). The CCITT standards set forth in Recommendations T.4 and T.6 define a standard coding scheme for Group 3 and Group 4 facsimile apparatus. The recommendations of the CCITT have established compatibility among manufacturers of facsimile equipment for communication of encoded facsimile data.

The CCITT Group 3 apparatus uses a modified Huffman (MH) coding scheme for one-dimensional coding and a modified Relative Element Address Designate (MR) coding scheme for two-dimensional coding. The CCITT Group 4 apparatus uses a modified MR (MMR) coding scheme for two-dimensional coding. The one-dimensional MH coding method uses Huffman codes for the run length of black or white picture elements (PELs).

The two-dimensional coding method encodes the picture by using not only the current line information but also the previous line information. This method is a line-by-line coding method in which the position of each changing PEL on the coding line is coded with respect to the position of a corresponding reference PEL situated on either the coding line or a reference line. Based on the relative position of changing PELs, three coding modes are defined in the CCITT standards: Pass mode, Vertical mode and Horizontal mode.

For the two-dimensional coding, the CCITT standard identified five color changing elements, a0, a1, a2, b1 and b2, which are elements whose "color" differs from that of the previous adjacent element along the same scan line. The a0 is the reference or starting element on the coding line. At the start of the coding line, a0 is set on an imaginary white changing element situated just before the first element on the line. During the coding of the coding line, the position of a0 is defined by the previous coding mode. The a1 is the next changing element to the right of a0 on the coding line. The a2 is the next changing element to the right of a1 on the coding line. The b1 is the first changing element on the reference line to the right of a0 and of the opposite color to a0. The b2 is the next changing element to the right of b1 on the reference line.

The pass mode is identified when the position of b2 lies to the left of a1. When this mode has been coded, the picture element just under b2 is regarded as the new starting picture element a0 for the next coding. However, the state where b2 occurs just above a1 is not considered as a pass mode. If it is not a pass mode and the relative distance of a1b1 is less than or equal to three, then a vertical mode is identified. The relative distance a1b1 can take on one of seven values V(0), VR(1), VR(2), VR(3), VL(1), VL(2), and VL(3), each of which is represented by a separate code word. After the vertical mode has been coded, position a1 is regarded as the new starting picture element a0 for the next coding. Also, if it is not a pass mode and the relative distance of a1b1 is greater than three, then a horizontal mode is identified. When this mode is identified, both the run-lengths a0a1 and a1a2 are coded using the code words H +M(a0a1) +M(a1a2), where M(XY) is a standard run-length code for the length X to Y. After the horizontal mode has been coded, position a2 is regarded as the new starting picture element a0 for the next coding.

2. Description of the Prior Art

Prior art systems for decoding or expanding facsimile coded data to digital pixel image information suffer such disadvantages as being slow or of complicated and expensive design. In such prior art systems, the codes received for decoding are latched on word boundaries which have no correlation to the actual variable code lengths. Therefore, a single code may be included in more than one word of digital data received by a system. Hence, the prior rat systems require complicated algorithms for isolating codes in the incoming data stream.

In addition, according to the CCITT standards, the color change elements on a reference line must be identified. In the prior art, systems for identifying the relevant color change elements in a reference line have involved full line length accumulators which are large and complex logic designs. Further, the information concerning the location of a particular color change element is derived on a pixel by pixel basis in review of the previously decoded reference line.

U.S. Pat. No. 4,533,956 invented by Fedde, entitled APPARATUS FOR CONVERTING FACSIMILE CODED DATA TO VIDEO DATA, issued Aug. 6, 1985, typifies the complicated and relatively slow systems of the prior art.

SUMMARY OF THE INVENTION

The present invention provides a windowing state machine architecture for decoding facsimile coded data to image data. The windowing state machine architecture taught by the present invention is fast and compact, and thereby suitable for implementation in a single integrated circuit.

In one aspect, the present invention is an apparatus for decoding a series of facsimile codes to generate a facsimile of an image, the facsimile being represented by a plurality of scan lines and each scan line being represented by a plurality of picture elements. Each picture element in each scan line is characterized by pixel data indicating the color of the picture element. The apparatus comprises code windowing means, connected to receive the series of facsimile codes and code window control signals for selecting a code from the series. In communication with the code windowing means is a decoding ROM or other means for generating first intermediate codes and the code window control signals.

The apparatus further includes a reference windowing means, connected to receive pixel data generated during the decode of a previous scan line of the facsimile and reference window control signals, for selecting a reference window of pixel data from the previous scan line. The reference windowing means is controlled in response to the first intermediate codes by means generating the reference window control signals. A control means coupled to receive the first intermediate codes and responsive to the reference window is included for generating a second intermediate code consisting of an output color flag and a picture element run-length value. Strings of pixel data are then produced in response to the output color flag and run-length values.

DESCRIPTION OF THE PREFERRED EMBODIMENT

Figure 1:
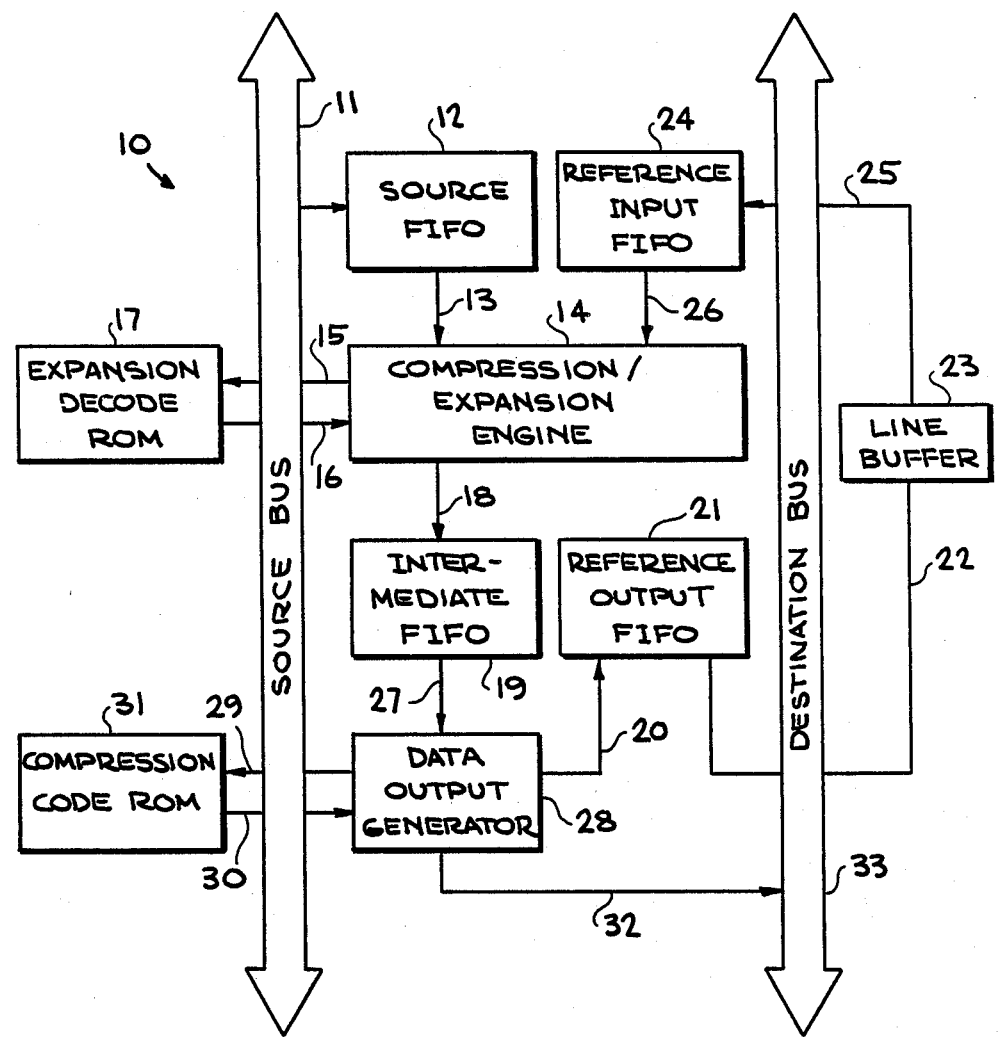
FIG. 1 is a block diagram of an apparatus implementing the present invention.
Figure 2A:
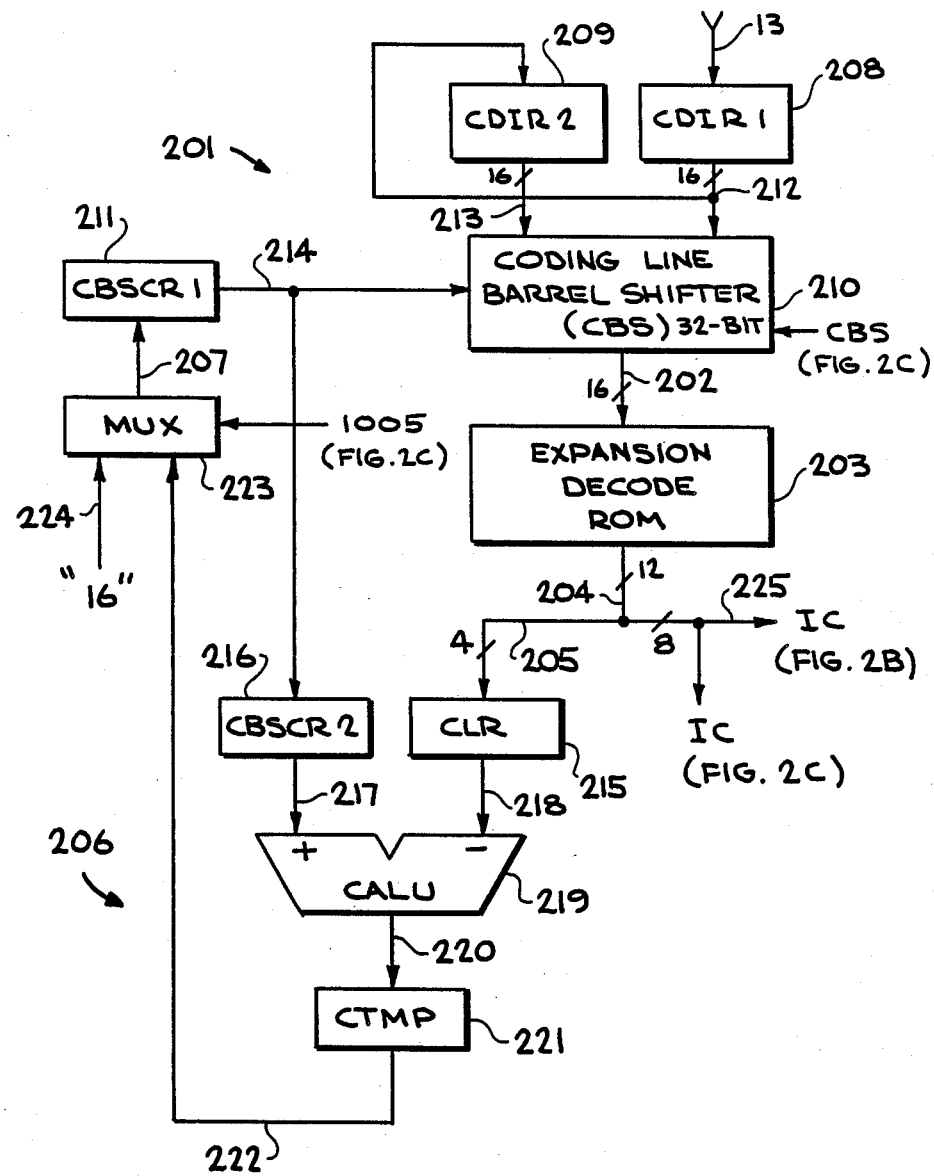
FIGS. 2A through 2C are a detailed block diagram of the expansion engine illustrating the preferred embodiment of th present invention.
Figure 2B:
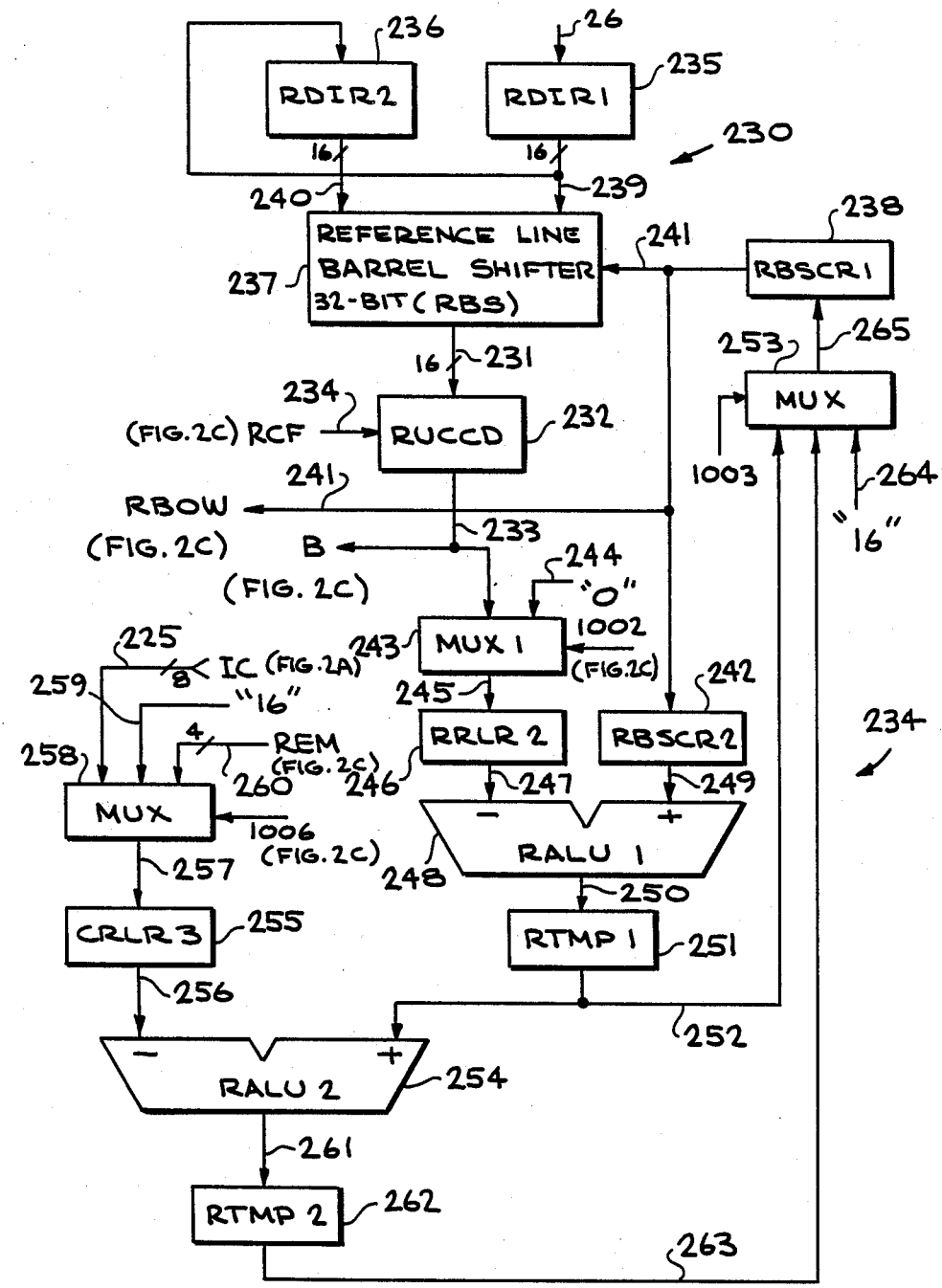
Figure 2C:
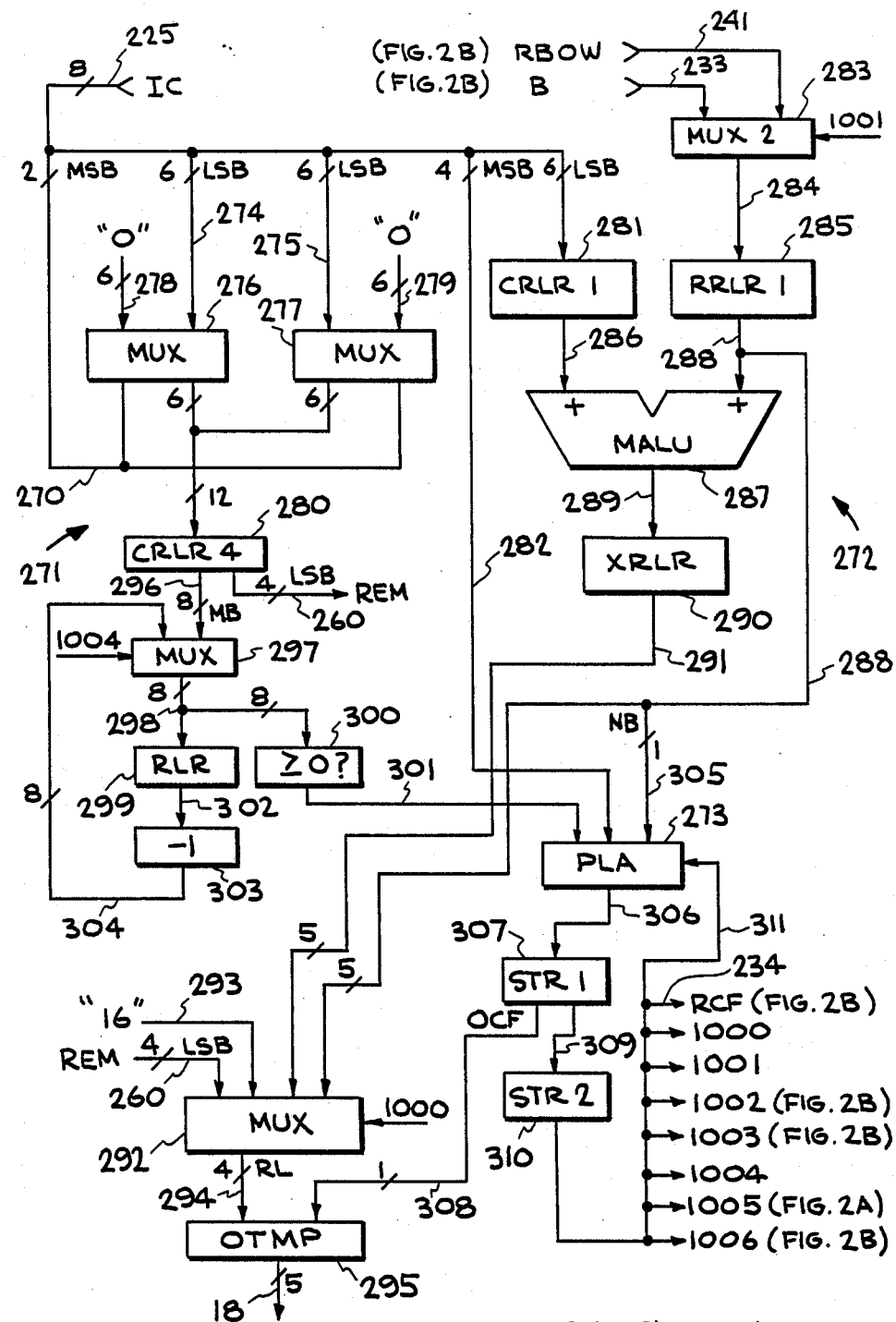
Figure 3:
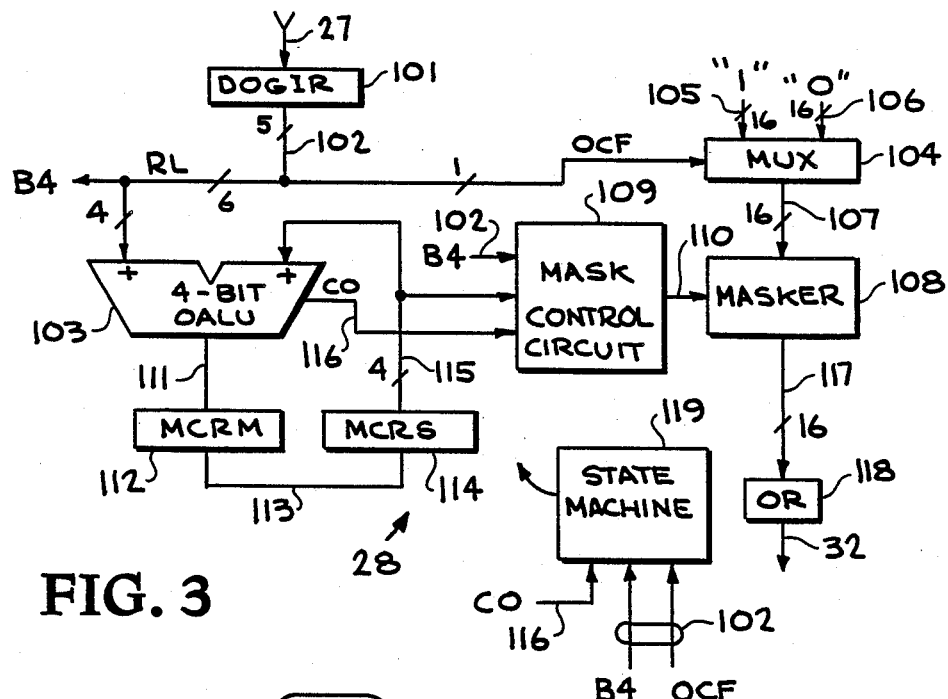
FIG. 3 is a block diagram of the data output generator according to the present invention.

With reference to FIGS. 1-3, a detailed description of the preferred implementation of the present invention is provided. With reference to FIGS. 4-11 and logic tables provided in the specification, the operation of the preferred implementation is described.

I. Decoding System Overview

FIG. 1 provides a block diagram of a decoding apparatus 10 according to the present invention. The apparatus 10 includes a source bus 11 on which words of data including codes characterizing a facsimile of an image are supplied. The words are supplied from the source bus 11 to a source first-in-first-out (FIFO) buffer 12. From the source FIFO buffer 12, the words are supplied across line 13 to a compression/expansion engine 14. The compression/expansion engine 14 communicates across lines 15 and 16 with an expansion decode ROM 17. The compression engine is not important to the present invention and is not further described herein. An overall system for facsimile encoding and decoding would include the compression engine and compression code ROM 31 as is described in the above cross-reference application.

An intermediate code output of the compression/expansion engine 14 is provided across line 18 to an intermediate FIFO buffer 19. The output on line 18 through the intermediate FIFO buffer 19 is supplied on line 27 to a data output generator 28. The data output generator 28 generates output words of picture element data for supply to the destination bus 33 in response to the intermediate codes. In addition, the data output generator 28 supplies a reference output on line 20 to a reference output FIFO buffer 21. The reference output FIFO buffer 21 supplies reference lines across line 22 to a line buffer 23. The line buffer 23 is connected to a reference input FIFO buffer 24 across line 25. The reference input FIFO buffer 24 supplies a reference line pixel data across line 26 to the compression/expansion engine 14 for use in generation of the intermediate code output on line 18.

The destination bus 33 provides the decoded facsimile to a system for transmitting the data words to a destination location where the data words can be stored or used to regenerate the facsimile.

II. Expansion Engine

FIGS. 2A through 2C illustrate the preferred implementation of the expansion engine of the apparatus shown in FIG. 1. FIG. 2A illustrates the code windowing means represented generally by reference numeral 201 for selecting a code from a series of facsimile coded data supplied on line 13 from the source FIFO 12 shown in FIG. 1. The code windowing means 201 supplies a selected code on line 202 to a decoding means for generating a first intermediate code, comprising an expansion decode ROM 203. The expansion decode ROM 203 supplies an output on line 204 in response to the selected code. The output on line 204 includes a 4-bit code length value on line 205 and an intermediate code on line 225. The 4-bit code length value on line 205 is supplied to a coding window control means designated generally by the numeral 206. The coding window control means 206 generates a coding window control signal on line 207 for supply to the code windowing means 201.

The intermediate code IC on line 225 is used in the apparatus illustrated in FIGS. 2B and 2C as illustrated below.

The code windowing means 201 includes a first coding data input register CDIR1 208 and a second coding data input register CDIR1 209. In addition, a coding line barrel shifter CBS 210 and a coding line barrel shifter control register first CBSCR1 211 are included in the code windowing means. As mentioned above, input data words making up a series of facsimile codes according to the CCITT standard are received on line 13 and loaded to the CDIR1 208. The output on line 212 of the CDIR1 is connected across line 212 as a rightmost input to the CBS 210 and as an input to the CDIR2 209. The output on line 213 of the CDIR2 is supplied as a leftmost input to the CBS 210. In the preferred embodiment, the input data words are 16 bits long and the coding line barrel shifter is 32 bits long. The output of the CBS 210 is a 16-bit word on line 202 which is selected in response to the coding line beginning of window code stored in CBSCR1 211 across line 214. The maximum code length for CCITT standard codes is 13 bits.

As mentioned above, the output of the CBS 210 is supplied on line 202 to the expansion decode ROM 203. The expansion decode ROM 203 generates an output as illustrated in Table 1 below.

TABLE 1

| | | | EXPANSION DECODE ROM | | | | | | | | |
|---|---|---|---|---|---|---|---|---|---|---|---|
| b11 | b10 | b9 | b7 | b6 | b5 | b4 | b3 | b2 | b1 | | b0 |
| . | Code Length | | 0 | 0 | ( MU code ) | | | | | | Make-up code |
| | | | 0 | 1 | ( TM code ) | | | | | | Terminate code |
| | | | 1 | 0 | 0 | 0 | 0 | 0 | 0 | 0 | V(0) |
| | | | 1 | 0 | 0 | 0 | 0 | 0 | 0 | 1 | VR(1) |
| | | | 1 | 0 | 0 | 0 | 0 | 0 | 1 | 0 | VR(2) |
| | | | 1 | 0 | 0 | 0 | 0 | 0 | 1 | 1 | VR(3) |
| | | | 1 | 0 | 0 | 1 | 1 | 1 | 1 | 1 | VL(1) |
| | | | 1 | 0 | 0 | 1 | 1 | 1 | 1 | 0 | VL(2) |
| | | | 1 | 0 | 0 | 1 | 1 | 1 | 0 | 1 | VL(3) |
| | | | 1 | 0 | 1 | 0 | 0 | 0 | 0 | 0 | P |
| | | | 1 | 0 | 1 | 1 | 0 | 0 | 0 | 0 | H |
| | | | 1 | 1 | 0 | 0 | X | X | X | X | EOL |
| | | | 1 | 1 | 0 | 1 | X | X | X | X | FILL Bits |
| | | | 1 | 1 | 1 | X | X | X | X | X | Illegal codes |

The 4 leftmost bits of the output of the expansion decode ROM are a code length value which is supplied on line 205 to a code length register CLR 215. The coding line beginning of window signal on line 214 is likewise loaded to a second coding barrel shifter control register CBSCR2 216. The outputs of the CBSCR2 216 and CLR 215 are supplied across lines 217 and 218, respectively, as inputs to a coding line arithmetic logic unit CALU 219. The CALU 210 operates to subtract the code length from the CLR 215 from the coding line beginning of window signal in the CBSCR2 216 to generate a shift value on line 220. The shift value is loaded to a coding window temporary register CTMP 221. The output of the CTMP 221 is supplied on line 222 as one input to multiplexer 223. The second input to multiplexer 223 is a constant vlaue "16" on line 224. The multiplexer 223 is controlled by the state machine implemented in the programmable logic array described below to supply the coding line beginning of window signal on line 207 to the CBSCR1 211.

FIG. 2B illustrates the reference windowing means indicated generally by the reference numeral 230. The reference windowing means 230 receives decoded pixel data from a previous scan line of the facsimile being transferred across line 26 from the reference input FIFO 24 shown in FIG. 1 and supplies a selected reference window of pixel data across line 231 to a reference line unidirectional color change detector RUCCD 232.

The implementation of the reference line unidirectional color change detector RUCCD 232 is described in detail in the cross-referenced U.S. Patent application entitled APPARATUS FOR TWO-DIMENSIONALLY ENCODING IMAGE DATA DATA TO FACSIMILE CODED DATA.

The output of the RUCCD 232 is supplied on line 233 in the form of a signal indicating the position of a desired color changing element within the selected reference window on line 231. The desired color changing element is selected by the reference line color flag signal RCF on line 234 which is generated by the state machine described below. This desired color changing element will be either the first white element following immediately after a black element or the first black element following immediately after a white element in the reference window. The equivalent embodiments for systems in which the coded data can result in a large variety of colors than black and white might include more complicated outputs for the color change detector for proper decoding. However, as the preferred embodiment is adapted for decoding the above-described CCITT standard facsimile codes, only black and white are involved. The signal on line 233 indicating the position of the first desired color change element within the reference window is referred to as the value B. The value B is supplied on line 233 to the apparatus illustrated in FIG. 2C and to a means designated generally by the reference numeral 234 for generating the reference window control signals on line 265. The means 234 for generating the reference window control signals on line 265 also receives the intermediate codes on line 225.

The reference windowing means 230 includes a first reference data input register RDIR1 235 and a second reference data input register RDIR2 236. Also the means 230 includes a reference line barrel shifter RBS 237 and a reference line barrel shifter control register first RBSCR1 238.

The RDIR1 235 receives the reference line pixel data across line 26. The output of the RDIR1 is supplied on line 239 as the rightmost input to the RBS 237 and as an input to the RDIR2 236. The RDIR2 236 supplies its output across line 240 as a leftmost input to the reference line barrel shifter RBS 237. The output of the reference line barrel shifter 237 is a selected reference window on line 231 16-bits wide starting at the bit position indicated by the reference line beginning of window signal supplied across line 241 from the RBSCR1 238. The reference line beginning of window signal RBOW on line 241 is also supplied to the hardware illustrated in FIG. 2C as described below, and to a second reference barrel shifter control register RBSCR2 242 in the means 234 for generating the reference window control signals on line 265.

As mentioned above, the other inputs to the means 234 for generating the reference window control signals include the intermediate codes on line 225 and the value B on line 223.

Value B on line 233 is supplied as a first input to multiplexer MUX1 243. The second input to multiplexer MUX1 243 is a constant equivalent to "0" on line 244. The output of the multiplexer 243 is supplied on line 245 to a second reference line run-length register RRLR2 on line 246. The RRLR2 246 supplies its output on line 247 as a first input to a first reference window arithmetic logic unit RALU1 248. The second input the RALU1 248 is supplied on line 249 from the RBSCR2 242. The RALU1 generates the difference between the reference window beginning of window signal from the RBSCR2 and the value of B or "0" from the RRLR2 as its output on line 250. The output is latched in the first reference window temporary register RTMP1 251. The output of the RTMP1 is supplied on line 252 as a first input to a multiplexer 253 and as one input to a second reference window arithmetic logic unit RALU2 254. The second input to the RALU2 is a value selected from a coding line run-length register CRLR3 255 across line 256.

The CRLR3 is loaded across line 257 from a multiplexer 258. The multiplexer selects one of three inputs as its output from among the intermediate code supplied on line 225, a constant equal to the equivalent of "16" on line 259 and the value of the remainder REM generated on line 260 in the apparatus illustrated in FIG. 2C.

The RALU2 254 generates an output which is the difference between the value in the register RTMP1 251 indicating the difference between the reference line beginning of window and the detected color change element location and the value in the CRLR3 255 which generally indicates a decoded relative run-length in the coding line. Its output is supplied on line 261 to a second reference window temporary register RTMP2 262. The output of the RTMP2 is supplied on line 263 as a second input to the multiplexer 253. The third input to the multiplexer 253 is a constant equivalent to "16" on line 264.

The multiplexer 253 selects one of its three inputs under control of the state machine described below as the reference window control signal on line 265.

FIG. 2C illustrates the portion of the expansion engine in which the first intermediate codes on line 225, the reference window beginning of window signal on line 241 and the value of B on line 233 indicating the first desired color change element in the reference window are used to generate a second intermediate code including a run-length value and an output color change flag on line 18 for supply to the data output generator.

As discussed above, the CCITT standards include a vertical mode, a horizontal mode and a pass mode. The apparatus illustrated in FIG. 2C includes means for generating run-length values supporting the horizontal mode designated generally by the reference numeral 271 and means for generating run-length values supporting the vertical modes and pass mode designated generally by the reference numeral 272. Also, a programmable logic array PLA 273 implements a state machine which controls the operation of the expansion engine and supplies the output color flag.

The first intermediate codes are supplied on line 225 in the form of an 8-bit code. The 6 less significant bits of the code are supplied on lines 274 and 275 to multiplexers 276 and 277, respectively. The second inputs to both multiplexers 276 and 277 include a 6 bit constant equivalent to "0" on lines 278 and 279, respectively. The outputs of both multiplexers are 6-bit values which are concatenated and stored in a 12-bit coding window run-length register CRLR4 280.

Multiplexers 276 and 279 are controlled by the MU/TM signal on line 270. The MU/TM signal is derived from b7 and b6 of the intermediate code IC generated by the expansion decode ROM 203 to indicate whether a make-up or termination code is being supplied on line 225 (see Table 1). If a make-up code is being supplied, the multiplexer 277 selects the constant "0" and the multiplexer 276 selects the value on line 274. On the other hand, if a termination code is being deocded, the multiplexer 276 selects the constant "0" and the multiplexer 277 then selects the value on line 275.

The 6 less significant bits of the intermediate code on line 225 are likewise stored in a coding line run-length register CRLR1 281. The 4 more significant bits of the intermediate code on line 225 are supplied on line 282 as an input to the programmable logic array 273.

The reference window beginning of window signal on line 241 and the value B on line 233 are supplied to multiplexer MUX2 283. The output of the multiplexer 283 is supplied on line 284 to a reference window run-length register RRLR1 285.

The contents of the CRLR1 281 are supplied on line 286 as one input to an arithmetic logic unit MALU 287. The second input to the MALU 287 is the value in the RRLR1 across line 288. The output of the MALU 287 is supplied on line 289 to a difference run-length register XRLR 290. The value in the register XRLR 290 is a number indicating the decoded run-length for output. The output of the XRLR 290 is supplied on line 291 as one input to an output multiplexer 292. The value in the RRLR1 285 is also supplied across line 288 as a second input to the output multiplexer 292. The third input to the output multiplexer 292 is the remainder value REM on line 260 and the fourth input to the output multiplexer 292 is a constant equivalent to "16" on line 293. The output of the multiplexer 292 is supplied on line 294 as the run-length for supply to an output temporary register OTMP 295.

The remainder signal REM on line 260 is made up of the 4 less significant bits of the 12-bit signal in CRLR4 280, which will be explained below.

The 8 leftmost bits of the 12-bit signal in CRLR4 280 are supplied on line 296 to multiplexer 297. The output of the multiplexer 297 is supplied on line 298 to a run-length register RLR 299. In addition, the 8 bits on line 298 are supplied to a comparator 300 which asserts a signal on line 301 which indicates when the run length represented by these 8 bits is equal to 0 or greater than 0. A greater than zero signal on line 301 means that the decoded run-length in horizontal mode is more than or equal to 16. Since the window means only moves the reference window 16 bits at most for each time, the decoded run length in horizontal mode is separated into run-lengths of 16 or with a remainder less than 16. The signal on line 301 is supplied as an input to the programmable logic array 273.

The output of the RLR 299 is supplied one line 302 to a decrementer 303 which decrements the value of these 8 more significant bits by 1. The output of the decrementer is supplied on line 304 as a second input to multiplexer 297 which is controlled by the programmable logic array 273 as described below.

As described before, the programmable logic array receives the signal on line 301 as a first input and the 4 more significant bits of the intermediate code on line 282 as a second input. In addition, the programmable logic array 273 receives the most significant bit of the value stored in RRLR1 285 across line 305. This most significant bit designated NB is true when there is no color change element detected in the reference window.

The output of the programmable logic array 273 is supplied on line 306 to a first state register STR1 307. The code supplied to the STR1 307 includes the output color flag OCF on line 308. The output color flag on line 308 is supplied to the OTMP 295 for supply to the data output generator. The STR1 307 also supplies its output on line 309 to a second state register STR2 310. The output of STR2 310 which indicates the current state is supplied on line 311 to the programmable logic array 273. Also, mux control signals on lines 1000-1006 and the reference line color flag RCF on line 234 are part of the output on line 311.

The OTMP 295 supplies its output on line 18 in the form of a 5-bit code which includes in its 4 leftmost positions a run-length value and in its 1 rightmost position an output color flag. This code on line 18 is supplied through an intermediate FIFO 19 across line 27 to the data output generator 28. The data output generator 28 is described with reference to FIG. 3.

III. Data Output Generator

The data output generator 28 shown in FIG. 1 is set out in detail in FIG. 3. As mentioned above, the data output generator receives an input code on line 27 through the FIFO buffer 19 in the form supplied through the output temporary register OTMP 295 in FIG. 2C. The output of the data output generator on line 32 is decoded picture element data first supplied at a destination bus 33.

The code on line 27 is supplied to a data output generator input register DOGIR 101. The output of the DOGIR 101 is supplied on line 102 such that the first 4 bits containing the run-length value are supplied as a first input to an output generator arithmetic logic unit OALU 103 and a fifth bit comprising the output color flag OCF is supplied as a control signal to multiplexer 104. Multiplexer 104 includes a first input which is all ones and a second input which is all zeros on lines 105 and 106, respectively. The output of the multiplexer 104 is either 16 ones or 16 zeros on line 107 depending on the value of the output color flag on line 102. The ones or zeroes on line 107 are supplied to a masker 108. The masker 108 is controlled by a mask control circuit 109 which supplies a mask signal on line 110 to the masker 108.

The output of the OALU 103 is supplied on line 111 to a mask control register master MCRM 112. The output of the MCRM 112 is supplied on line 113 to a mask control register slave MCRS 114. The output of the MCRS 114 is supplied on line 15 as an input to the mask controller 109 and as a second input to the OALU 103. The mask controller 109 also receives the carry out signal on line 116 from the OALU.

The output of the masker 108 is supplied on line 117 to an output register 118. The output register 118 is connected to the destination bus across line 32 as illustrated in FIG. 1.

The masker 108 includes the mask register that latches the input bits across line 107 in all bit positions except the number of leftmost positions indicated by the signal on line 110 from the mask controlled 109. The mask controller 109 decodes the value in the MCRS 114 to generate the signal on line 110 for controlling the masker 108.

The operation of the data output generator 28 is controlled by a state machine 119 which receives as inputs the carry out signal on line 116 from the OALU 103 and the output color flag OCF from line 102. the state machine 119 controls the output data generator 28 to supply the digital pixel information as illustrated by the following example.

Suppose a series of codes are received in the data output generator input register DOGIR 101 indicating a sequence of 3 white pixels, 8 black pixels, 6 white pixels, 16 black pixels and 10 white pixels. During initialization, the MCRM and MCRS are equal to zero. For the first code, 3 white, the output color flag OCF will select zeros through multiplexer 104 for supply to the masker 108. The OALU 103 will add the value 3 to zero and store the value 3 in the MCRM 112. Because MCRS 114 still contains the value zero, the mask controller 109 will pass all 16 white bits through the masker 108. Thus, the mask register will include 16 zeros as follows:

0 0 0 0 0 0 0 0 0 0 0 0 0 0 0 0.

The following code requires 8 black pixels. Thus, the output color flag will select ones through multiplexer 104 for supply to the masker. The MCRM will be loaded with the value of the previous run-length 3 plus the current run-length 8 equal to 11. The MCRS 114 will have the value 3 causing the mask controller to mask the first 3 bits in the mask register from the input. Accordingly, the mask register will include the following information:

0 0 0 1 1 1 1 1 1 1 1 1 1 1 1 1.

The next code calls for 6 white pixels. Thus, the MCRM 112 will be updated by its previous value 11 plus 6 which equals 17. This results in the loading of 1 to the MCRM 112 and the generation of a carry out signal on line 116. The MCRS 114 will have the value 11 stored in it. The output color flag selects white or zeros through multiplexer 104 and the mask control 109 receives the value of 11; the contents of the mask register will be updated to the following:

0 0 0 1 1 1 1 1 1 1 1 1 0 0 0 0 0.

Since the carry out signal was asserted, the state machine 119 will cause the contents of the mask register to be loaded to the output register 118 for supply to the destination bus. Further, since carry has been asserted, the mask controller 109 will be disabled allowing all of the zeros on line 107 to be loaded to the mask register resulting in the following values residing in the mask register:

0 0 0 0 0 0 0 0 0 0 0 0 0 0 0 0.

The following code calls for a string of 16 black pixels. The value 1 in the MCRM is latched to the MCRS register 114. The value 16 is represented in the run-length code on line 102 by a 1 indicated by the signal B4, followed by 4 zeros. Thus, the input to the OALU will be 4 zeros which added to 1 is equal to 1 resulting in loading of the MCRM 112 with the value of 1. However, because the value in the MCRS 114 is equal to 1, the mask controller will allow all but the first bit of ones to pass resulting in a value in the mask register of the following:

0 1 1 1 1 1 1 1 1 1 1 1 1 1 1 1.

In addition, because of the assertion of B4, the state machine 119 causes the contents of the mask register to be loaded to the output register 118 for supply to the destination bus. Next, since bit 4 of the run-length value is asserted, the mask controller will be disabled allowing all ones to be loaded into the mask register in the masker 108. This results in the following value being loaded in the mask register:

1 1 1 1 1 1 1 1 1 1 1 1 1 1 1 1.

The following code calls for a string of 10 white pixels. In this case, the value of 10 is added with the 1 in the MCRS 114 to result in the loading of the value 11 in the MCRM 112. The one in the MCRS 114 will result in masking the first bit in the mask register and the output color flag and will result in a selection of zeros through the multiplexer 104 to the masker 108. This results in the following value being loaded in the mask register:

1 0 0 0 0 0 0 0 0 0 0 0 0 0 0 0.

For the next word, the value in the MCRS will be equal to 11 and the sequence continues for the following codes.

IV. Operation of the Expansion Engine

The operation of the expansion engine as controlled by the programmable logic array 273 illustrated in FIG. 2C may be understood with reference to FIGS. 4 through 11 which illustrate the data flow through the windowing state machine.

Figure 4:
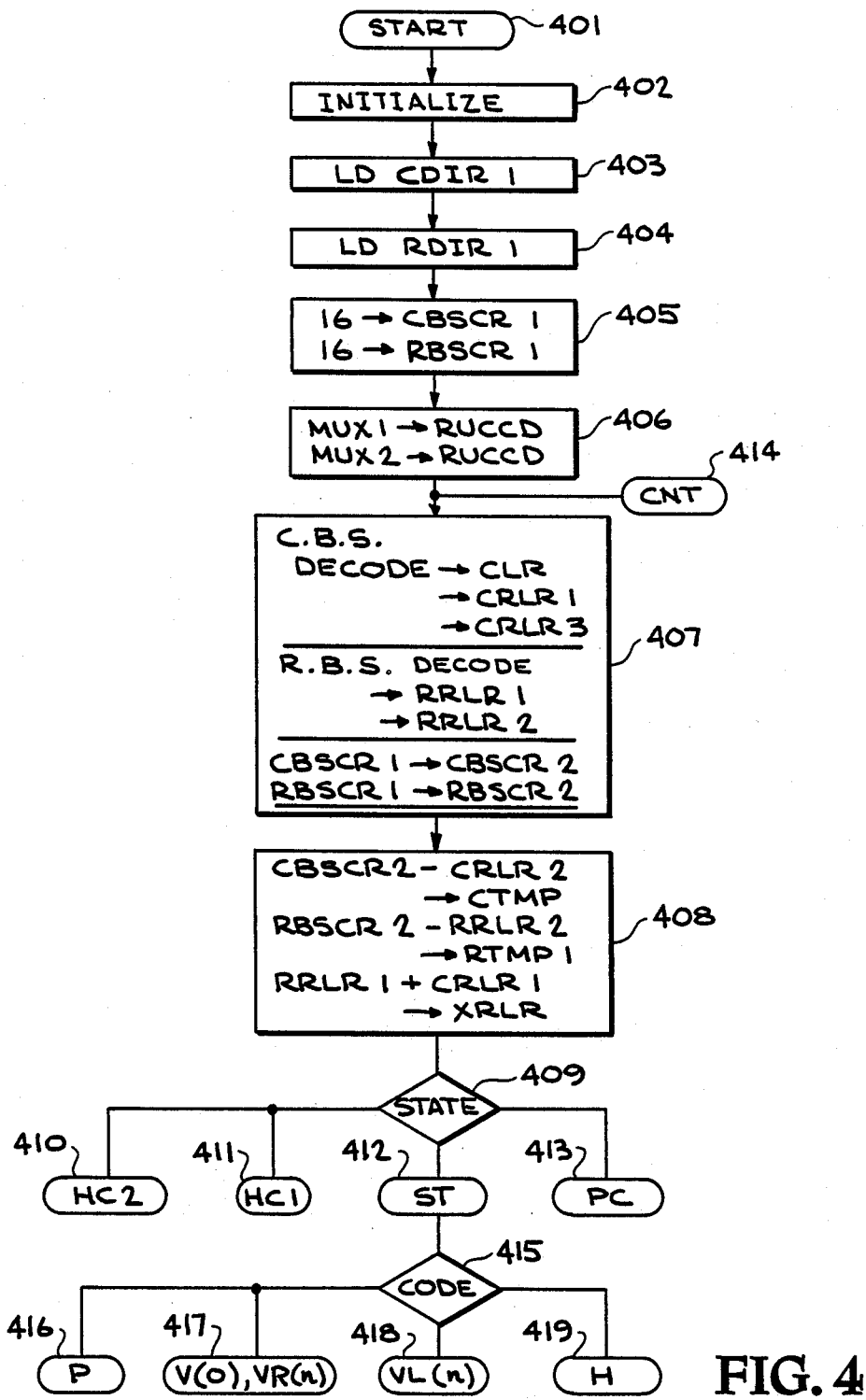

FIG. 4 illustrates the beginning of each flow through the expansion engine. The process starts as indicated in block 401. At first, the registers are initialized and the state machine begins in the ST state. The first step involves loading the CDIR1 with a data word comprising 16 bits from the string of facsimile coded data (block 403). The next step involves loading the reference data into the RDIR1 (block 404) for selection of a reference window.

For this starting state, both the CBSCR1 and the RBSCR1 are set to 16 (block 405). This causes selection of the 16 rightmost bits in the barrel shifters for supply as a reference window and coding window. In addition, the multiplexer 283 and the multiplexer 243 are both set to select the value B from the RUCCD 232 (block 406).

The next step involves decoding the selected window from the CBS and supplying the selected code length to the CLR register 215 and the intermediate codes to the CRLR1 281 and CRLR3 255 through the multiplexer 258. Also, the value B from the RUCCD is loaded into both the RRLR1 through multiplexer 283 and the RRLR2 through multiplexer 243. The contents of the CBSCR1 and RBSCR1 are loaded to the CBSCR2 and the RBSCR2, respectively (block 407).

After transferring data as indicated in block 407, the CALU 219 transfers the value (CBSCR2 - CLR) to the CTMP 221. Likewise, the RALU1 248 transfers the value (RBSCR2 - RRLR2) to the RTMP1 251. Finally, the MALU 287 transfers the sum of (RRLR1 + CRLR1) to the XRLR 290. The next step, the programmable logic array 273 executes a state change in response to the inputs (block 409). The 4 states to which the programmable logic array 273 can shift the expansion engine include the HC2 state 410, the HC1 state 411, the ST state 412 and the PC state 413. The 4 states possible in the state machine are set forth in the following Table 2. The state transitions are made as illustrated in the following Table 3.

TABLE 2

| | STATES | | |
|---|---|---|---|
| States | Information | RUCCD | Codes |
| ST | $a0 \leq BOW < b1$<br>$b1 = ?$<br>$b2 = ?$ | $B = b1$ | Any code |
| PC | $b1 \leq BOW < b2$<br>$b2 = ?$ | $B = b2$ | P |
| HC1 | $a0 \leq BOW < a1$<br>$a0 - a1 = ?$ | | H<br>$(a0 - a1)$ |
| HC2 | $a1 \leq BOW < a2$<br>$a1 - a2 = ?$ | | H<br>$(a1 - a2)$ |

TABLE 3

STATE TRANSITIONS

| | INPUTS | | | | OUTPUTS | | | | | | |
|---|---|---|---|---|---|---|---|---|---|---|---|
| State | Code | NB | MU/TM | RL = 0? | State | CBS | RBS | ORL | Ca0 | RCF | OCF |
| ST | P | 0 | | | PC | No | B | B | Ca0 | Ca0 | Ca0 |
| | P | 1 | | | ST | No | B | B | Ca0 | Ca0 | Ca0 |
| | V(0) | 0 | | | ST | Shift | B | B | Ca0 | Ca0 | Ca0 |
| | V(0) | 1 | | | ST | No | B | B | Ca0 | Ca0 | Ca0 |
| | VR(n) | 0 | | | ST | Shift | B+n | B+n | Ca0 | Ca0 | Ca0 |
| | VR(n) | 1 | | | ST | No | B | B | Ca0 | Ca0 | Ca0 |
| | VL(n) | 0 | | | ST | Shift | B−n | B−n | Ca0 | Ca0 | Ca0 |
| | VL(n) | 1 | | | ST | No | B−n | B−n | Ca0 | Ca0 | Ca0 |
| | H | | | | HC1 | Shift | 0 | 0 | Ca0 | | |
| PC | P | 0 | | | ST | Shift | B | B | Ca0 | Ca0 | Ca0 |
| | P | 1 | | | PC | No | B | B | Ca0 | Ca0 | Ca0 |
| HC1 | a0-a1 | | 0 | >0 | HC1 | No | 16 | 0 | Ca0 | | Ca0 |
| | a0-a1 | | 0 | =0 | HC1 | Shift | REM | MUa01 | Ca0 | | Ca0 |
| | a0-a1 | | 1 | >0 | HC1 | No | 16 | 0 | Ca0 | | Ca0 |
| | a0-a1 | | 1 | =0 | HC2 | Shift | REM | TMa01 | Ca0 | | Ca0 |
| HC2 | a1-a2 | | 0 | >0 | HC2 | No | 16 | 0 | Ca0 | | Ca0 |
| | a1-a2 | | 0 | =0 | HC2 | Shift | REM | MUa12 | Ca0 | | Ca0 |
| | a1-a2 | | 1 | >0 | HC2 | No | 16 | 0 | Ca0 | | Ca0 |

TABLE 3-continued
STATE TRANSITIONS

| INPUTS | | | | OUTPUTS | | | | | |
|---|---|---|---|---|---|---|---|---|---|
| State | Code | NB | MU/TM | RL = 0? | State | CBS | RBS | ORL | Ca0 | RCF | OCF |
| | a1–a2 | | 1 | =0 | ST | Shift | REM | TMa12 | Ca0 | | Ca0 |

Where:
(1) NB = 1: No color change is detected by RUCCD
 = 0: color change is detected by RUCCD
(2) TM = 1: Terminating code
 = 0: Make-up code
(3) RL: 8 MSB of run length value of a0–a1 or a1–a2
(4) Ca0: Color flag of a0 (also an input)
(5) OCF: Output color flag
(6) RCF: Color flag for RUCCD
(7) CBS = Shift: shift CBS to get next code
No: do not shift CBS
(8) RBS: Shift RBS to get next b1/b2
(9) ORL: Run length value for Data Output Generator
(10) MUa01: Run length value of Make-up code of a0–a1
(11) TMa01: Run length value of Terminating code of a0=a1
(12) MUa12: Run length value of Make-up code of a1–a2
(13) TMa12: Run length value of Terminating code of a1–a2
(14) P,V,H: CCITT defined 2-D modes
(15) REM: 4 LSB of run length value of a0–a1 or a1–a2
(16) B: Color change code from RUCCD If the state machine is in the ST state 412, then the intermediate code is tested to determine the mode of operation according to the CCITT standard (block 415). The output of the block 415 can result in a shift to the pass mode (block 416), the vertical mode (blocks 417 and 418), or the horizontal mode (block 419). In the vertical mode, the state machine operates on the V(O) mode in the same algorithm as the VR(n) mode.

Figure 10:
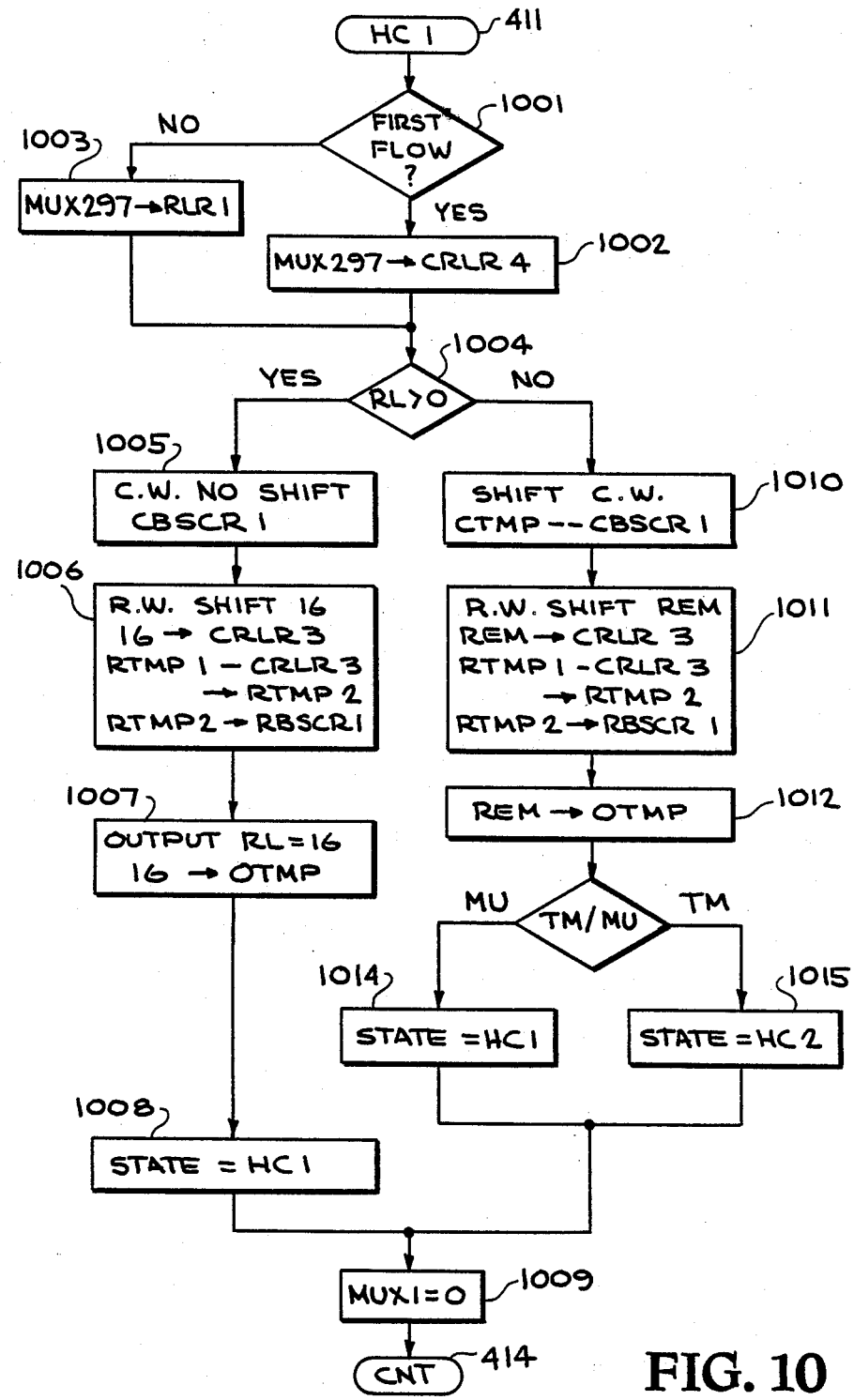
Figure 11:
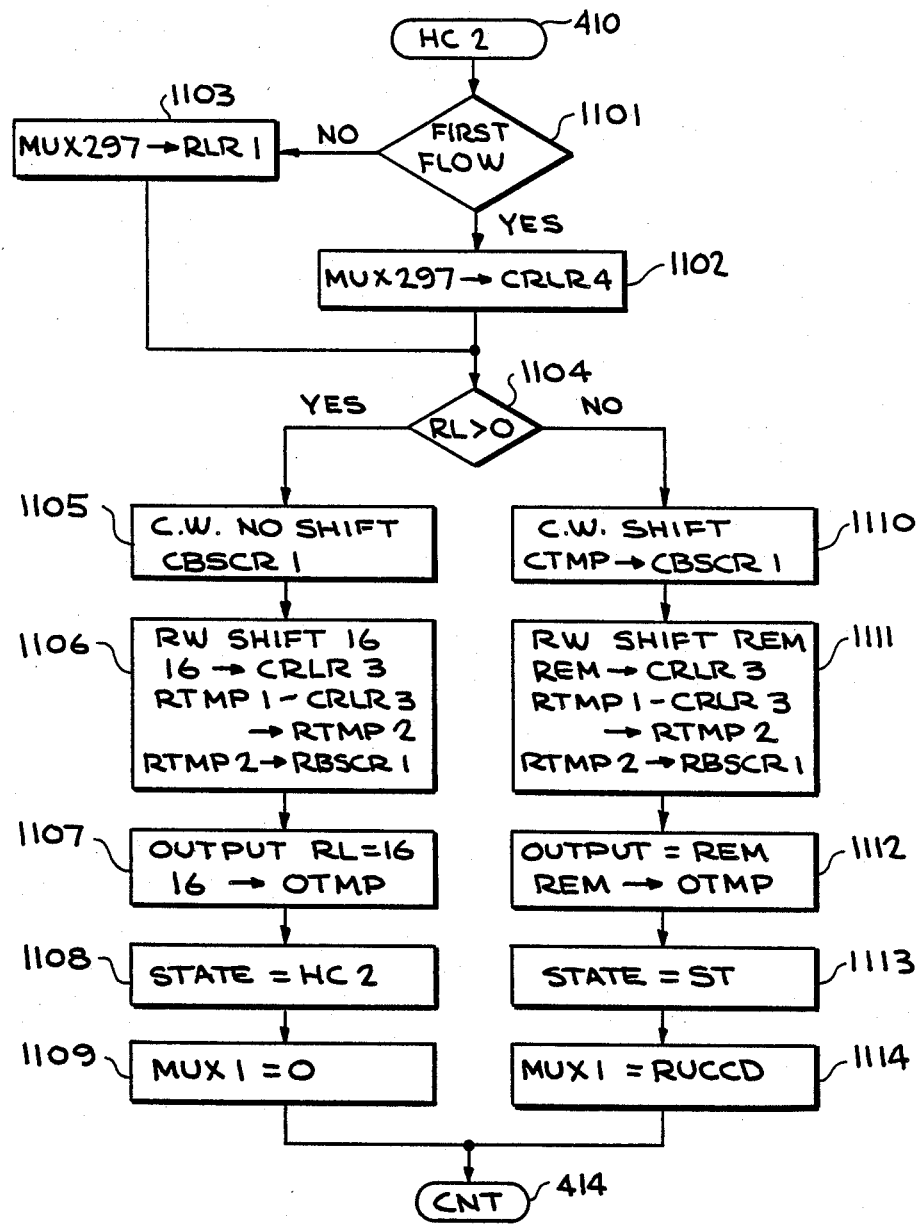

If the next state is determined in block 409 to be HC2 (block 41) then the state machine branches to the point shown in FIG. 11. If the next state is HC1 (block 411), then the state machine branches to the point shown in FIG. 10. Finally, if the next state determined in block 409 is PC (block 413), then the state machine branches to the point shown in FIG. 9.

When the machine is in the ST state (block 412), it operates differently according to the decoded intermediate code (block 425). If the code determined in block 415 is pass mode P, the state machine branches to the point shown in FIG. 5. If the code is the V(0) or VR(n), a branch is taken to the point shown in FIG. 6. If the code determined in block 415 is the VL(n) code, a branch is taken to the point shown in FIG. 7. If the code determined for block 415 is the H code, a branch is taken to the point shown in FIG. 8.

Figure 5:
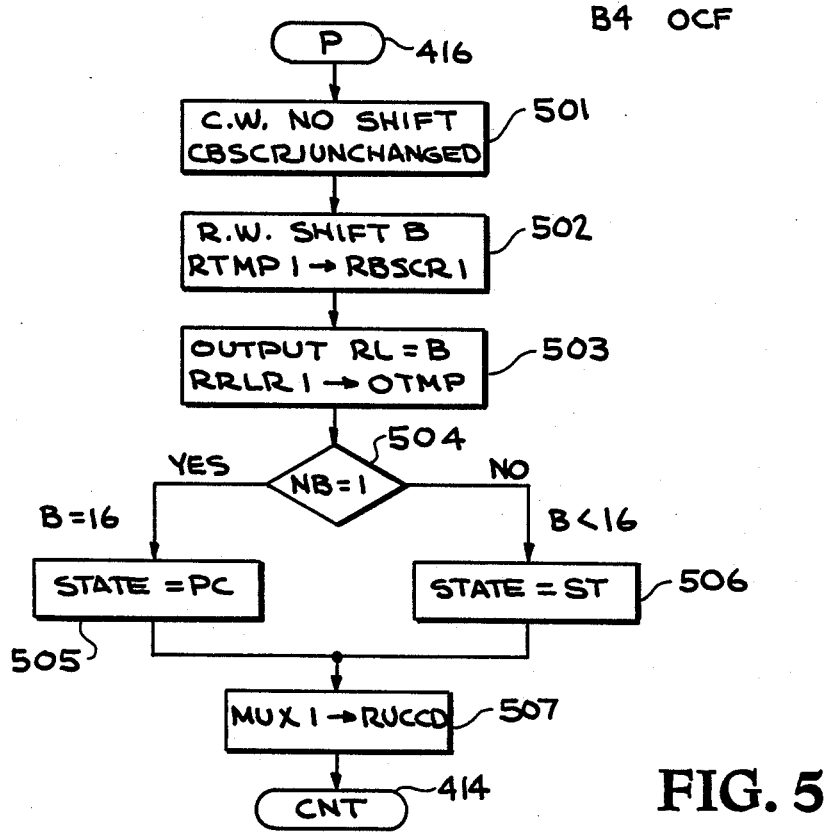
FIGS. 4 through 11 are flow charts illustrating the operation of the windowing state machine shown in FIGS. 2A through 2C.

FIG. 5 illustrates the pass mode algorithm which is entered at block 416 from FIG. 4. In the first step, the state machine disables any shift in the coding window by leaving the CBSCR1 unchanged (block 501). Next, the reference window is shifted by the value of B by loading the value in RTMP1 to RBSCR1 (block 502). The output value of RL is set equal to the value of B by loading RRLR1 to OTMP (block 503). Next, the state machine implemented by the PLA 273 tests whether the most significant bit of the value B designated NB is equal to 1 (block 504). If NB equals 1, then B equals 16 indicating that no color change was detected in the reference window and the state machine transitions to the PC mode (block 505). However, if the value of B was less than 16, that is, NB was not equal to 1, the state machine transitions to the ST state continuing the search for the first desired color change picture element (block 506). Finally, the multiplexers 283 and 243 are set to select the value B from the RUCCD 232 (block 507). Then the program loops to the continue entry point (block 414) in FIG. 4.

Figure 6:
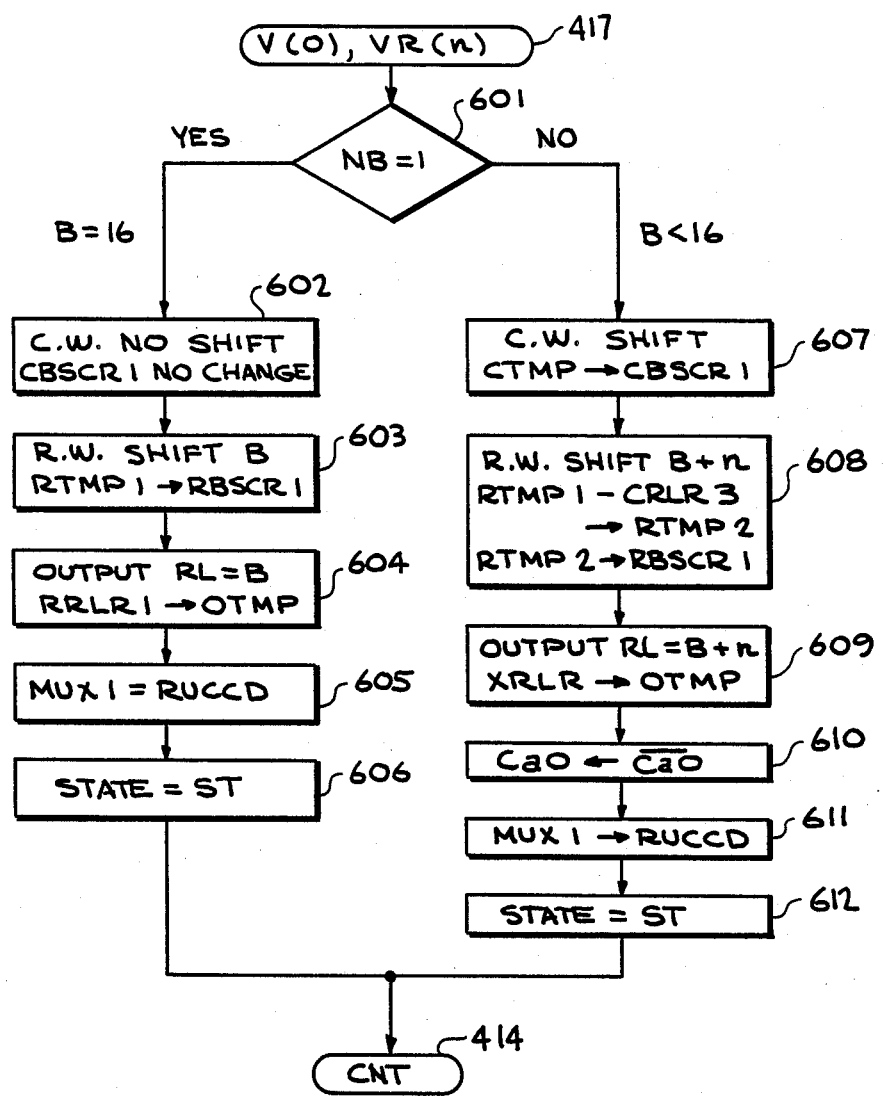

FIG. 6 illustrates the algorithm in the V(O) or VR(n) mode as entered from block 417 in FIG. 4. In the first step, the value of NB is tested to determine whether a color change element was detected in the reference window (block 601). If no color change element was detected, then the state machine disables shifting of the coding window by leaving CBSCR1 unchanged (block 602). The reference window is shifted by the value in B (16) by loading RTMP1 to RBSCR1 (block 603). The output run-length is set to the value of B by loading RRLR1 to OTMP (block 604). Next, the value of B from RUCCD is selected through multiplexers 243 and 283 (block 605) and the state transitions to the value of ST (block 606). The algorithm loops to the continue entry point 414 in FIG. 4.

If at block 601, a color change element was detected in the reference window, then the coding window is shifted by loading the value of CTMP to CBSCR1 (block 607). The reference window is shifted by the value of B +n by loading RTMP2 whose content is the difference between RTMP1 and CRLR3 to the RBSCR1 (block 608).

The output run-length is set to the value of B +n by loading XRLR to OTMP (block 609). The color of the a0 is inverted (block 610). Next, the value of B from the RUCCD is selected in multiplexers 243 and 283 (block 611) and the state remains in the ST state (block 612). Finally, the algorithm loops to the continue entry point 414.

Figure 7:
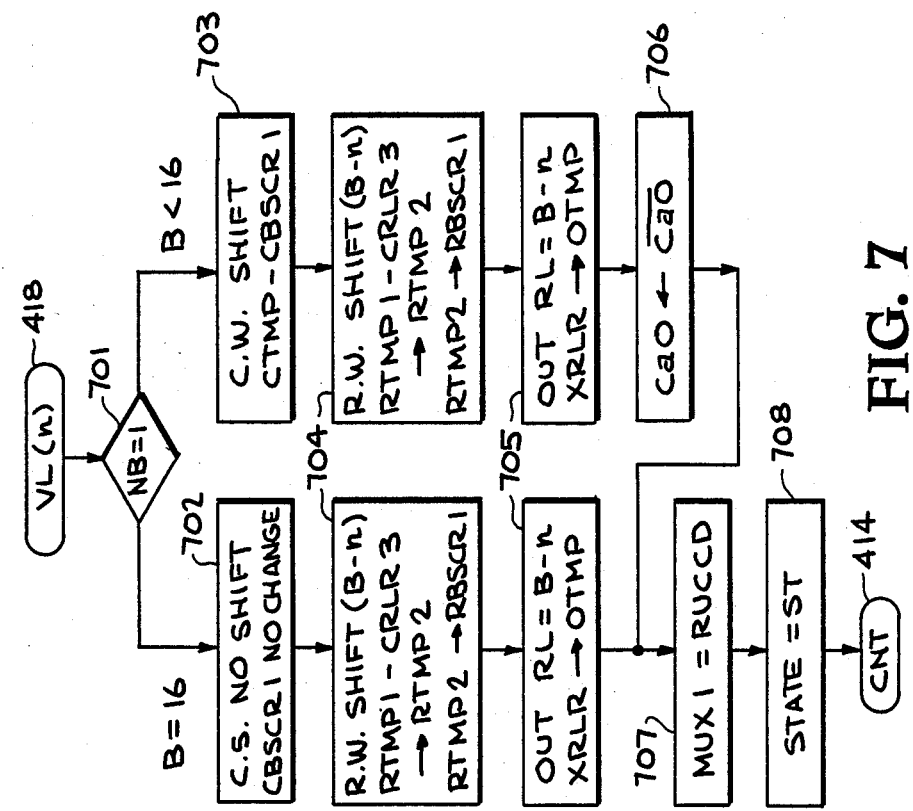

FIG. 7 illustrates the algorithm entered from the VL(n) mode from block 418 in FIG. 4. In the first step, the value of NB is checked to determine whether a color change element has been detected in the reference window (block 701). If no color change element is detected, then the coding window is not shifted by leaving the value of CBSCR1 unchanged (block 702). However, if a color change element is detected in the reference window, then the coding window is shifted by loading the value of CTMP to CBSCR1 (block 703). In either case, the reference window is shifted by the value of B-n by loading the difference between RTMP1 and CRLR3 to RTMP2 and loading the value of RTMP2 to RBSCR1 (block 704). Next, the output run length is set to the value of B-n by loading the XRLR to OTMP (block 705). For the case in which a color change element has been detected in the reference window (B is less than 16), the color of a0 is inverted (block 706). Next, the value of B from the RUCCD is selected in multiplexers 243 and 283 (block 707), the state transitions to the ST state (block 708), and the algorithm loops to the continue entry point 414.

Figure 8:
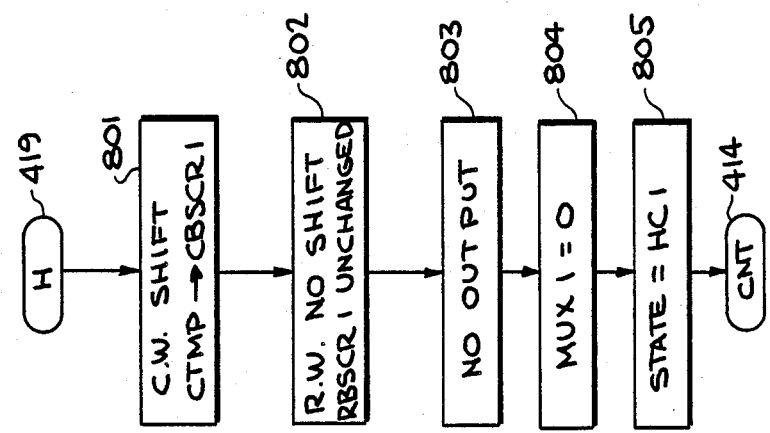

FIG. 8 illustrates the algorithm in horizontal mode as entered from block 419 in FIG. 4. In the horizontal mode, the first step involves shifting the coding window by loading the value of CTMP to CBSCR1 (block 801). Next, the reference window is not shifted by leaving the value in RBSCR1 unchanged (block 802). Next, the output is disabled (block 803) and the selector 243 is set to select the constant "0" (block 804). The state is then changed to HC1 (block 805) in order to encode the value of the run-length a0a1. Next, the algorithm loops to the continue entry point 414.

Figure 9:
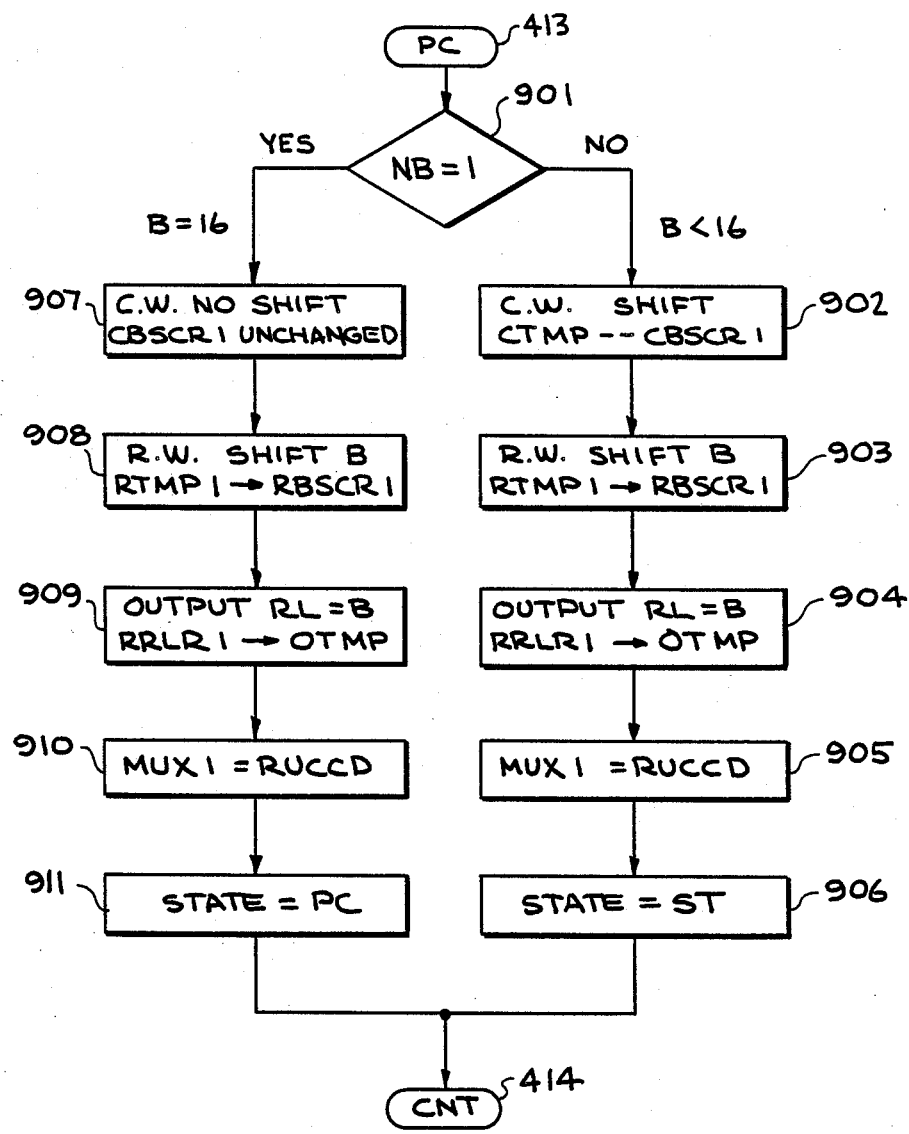

FIG. 9 illustrates the algorithm in the PC state entered from block 413 in FIG. 4. In this state, the pass mode is detected in a previous flow and the color change picture element b1 has been detected but the color changing picture element b2 has not yet been detected in the reference window. Therefore, the code remains the pass mode and a continuing loop search for the color change element b2 is made. Accordingly, the first step is to test whether a color change element has been detected in the reference window (block 901). If a color change element has been detected, then the value of B is less than 16 and the coding window will be shifted by loading the value of CTMP to CBSCR1 (block 902) in order to get the next code. The reference window will be shifted by the value of B by loading RMPT to RBSCR1 (block 903). Next, the output run-length is set to the value of B by loading the value of RRLR1 to OTMP (block 904). Next, the value of B from the shifted window is selected from the RUCCD in multiplexers 243 and 283 (block 906) and the algorithm loops to the continue entry point 414. If no color change element was detected in block 901, then the coding window is not shifted by leaving the value of CBSCR1 unchanged (block 907). The reference window is shifted by the value B (16) by loading the value of RTMP1 to RBSCR1 (block 908). The output run-length is set to the value of B (16) by loading RRLR1 to OTMP (block 909). The next value of B from the shifted reference window is loaded from the RUCCD through multiplexers 243 and 283 (block 910) and the machine remains in the PC state (block 911). Then the algorithm loops to the continue entry point 414.

FIG. 10 illustrates the algorithm in the HC1 state as entered from block 411 of FIG. 4. In this state, the run-length a0a1 is decoded for the horizontal mode detected during a previous flow of the algorithm. In the first block, it is determined whether this is the first flow of the HC1 state algorithm for the current code (block 1001). If it is the first flow, then the value of the 8 leftmost bits in CRLR4 are selected through multiplexer 297 (block 1002). If this is not the first flow, the value of RLR−1 is selected through multiplexer 297 (block 1003). Next, the comparator 300 determines whether the output of the multiplexer 297 is greater than 0 (block 1004). If the output is not equal to 0, then the coded window is not shifted by leaving the CBSCR1 unchanged (block 1005). Next, the reference window is shifted by the maximum 16 by loading the constant "16" into CRLR3, then loading the register RTMP2 with the value of RTMP1 - CBRLR3; and finally, loading the value of RTMP2 to RBSCR1 (block 1006). The output run-length is set to the value of 16 by loading the constant "16" to the OTMP (block 1007). The state remains HC1 (block 1008). Next, the multiplexer 243 is set to select the value of the constant "0" (block 1009) and the algorithm loops to the continue entry point 414.

If the output of multiplexer 297 is equal to 0, then the coding window is shifted by loading the value of CTMP to CBSCR1 (block 1010). The reference window is shifted by the value of REM by loading REM to the register CRLR3; then loading the register RTMP 2 with the value of RTMP1 minus CRLR3 and finally shifting the value of RTMP2 to RBSCR1 (block 1011). The output run-length is set to the value of REM by loading REM to OTMP (block 1012). Next, the state machine determines whether it is encoding a makeup or termination code (block 1013). If it is a makeup code, the state remains in MC1 to receive a following makeup code or termination code for encoding a0a1 (block 1014). If the code is a termination code, the state transitions to HC2 for decoding the value of the run-length a1a2 (block 1015). Next, the selector 243 is set to select the constant "0" (block 1009) and the algorithm loops to the continue entry point 414.

FIG. 11 illustrates the algorithm in the HC2 state as entered from block 410 of FIG. 4. In the HC2 state, the run-length a1a2 is decoded for the horizontal mode.

In the first step, it is determined whether this is the first flow for the current code (1101). If it is a first flow, then the multiplexer 297 is set to select the 8 leftmost bits of CRLR4 (block 1102). If it is not the first flow, the multiplexer 297 is set to select the value of RLR minus 1 (block 1103). In either case, the next step involves testing whether the output of the multiplexer 297 RL is equal to 0 (block 1104). If RL is not equal to 0, then the coding window is not shifted by leaving the value of CBSCR unchanged (block 1105). Next, the reference window is shifted by 16 by loading the constant 16 to CRLR3, then loading the difference between RTMP1 and CRLR3 to RTMP2, and finally loading RTMP2 to RBSCR1 (block 1106). Next, the output run-length is set to 16 by selecting the constant "16" to the OTMP register (block 1107). The state remains in the HC2 state and the multiplexer 243 is set to select the value of 0 (block 1109). Finally, the algorithm loops to the continue entry point 414.

If the output of multiplexer 297 is equal to 0, then the coding window is shifted to by loading the value of CTMP to CBSCR1 (block 1110). Next, the reference window to shifted by the value of REM, which is the 4 rightmost bits of CRLR4. This is accmplished by loading REM to CRLR3 through the multiplexer 258. Next, the register RTMP2 is loaded with the difference between RTMP1 and CRLR3 and, finally the contents of RTMP2 is selected to RBSCR1 (block 1111). Next, the output is set to the value of REM by loading REM to OTMP (block 1112). Next, the state is changed to the ST state (block 1113) and the multiplexer 243 is set to select the value of B from the RUCCD for the shifted reference window (block 1114) and the algorithm loops to the continue entry point 414.

CONCLUSION

In conclusion, the present invention provides a compact and fast architecture for decoding standard facsimile codes to pixel data which improves over the prior art. Not only is the present invention suitable for implementation in a single integrated circuit, but it also has advantages in speed over systems without the windowing state machine architecture.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for decoding input data words supplying a sequence of variable length codes specifying a facsimilar of an image, the facsimile being represented by a plurality of scan lines, each scan line being represented by a plurality of picture elements and each picture element being characterized by picture element data indicating a color of the picture element, to generate output words of picture element data for successive scan lines in the facsimile, comprising:
    code windowing means, connected to receive the input data words and responsive to a code window control signal, for selecting a coding window of data including a variable length code from the input data words, the coding window having a fixed length at least as long as the maximum length of the variable length codes;
    decoding means, connected to receive the data in the coding window, for generating a first intermediate code;
    reference windowing means, connected to receive picture element data from a reference scan line and responsive to a reference window control signal, for selecting a reference window of picture element data from the reference scan line;
    control means, connected to receive and responsive to the first intermediate code and the picture element data in the reference window, for generating a second intermediate code, the code window control signal and the reference window control signa; and
    output generator means, connected to receive the second intermediate code, for generating output data words of picture element data.

2. The aparatus of claim 1, wherein the decoding means includes means for generating a code length value indicating the length of a first variable length code in the coding window, and the control means includes:
    code window control means, responsive to the code length value, for generating a code window shift signal; and
    state machine means, responsive to the picture element data in the reference window and the first intermediate code, for controlling the code window control means to supply the code window shift signal to the code windowing means as the code window control signal.

3. The apparatus of claim 1, wherein the control means includes:
    color change detection means, connected to receive the picture element data in the reference window, for generating a color change signal indicating the position of a color change picture element in the reference window; and
    state machine means, responsive to the color change signal and the first intermediate code, for generating the second intermediate code, the code window control signal and the reference window control signal.

4. The apparatus of claim 3, further including:
    reference window control means, connected to receive the first intermediate code and the color change signal, for generating a beginning of window signal for the reference window;
    wherein the state machine means controls the reference window control means to supply the beginning of window signal to the reference windowing means as the reference window control signal.

5. The apparatus of claim 1, wherein the second intermediate code includes an output run length value and an output color flag, and the control means includes:
    means, responsive to the first intermediate code and the picture element data in the reference window, for generating a plurality of run length values;
    selector means, connected to receive the plurality of run length values, for selecting one of the plurality of run length values as the output run length value; and
    state machine means, responsive to the first intermediate code and the picture element data in the reference window, for controlling the selector means and generating the output color flag.

6. The apparatus of claim 5, wherein the plurality of run length values includes a first value for use in a first mode, a second value for use in a second mode and a third value for use in a third mode, the first, second or third mode being identified by the first intermediate code.

7. The apparatus of claim 6, wherein the first intermediate code identifies a horizontal mode, a vertical mode or a pass mode as the first, second or third modes, respectively.

8. An apparatus for decoding a sequence of variable length codes specifying a facsimile of an image, the facsimile being represented by a plurality of scan lines, each scan line being represented by a plurality of picture elements and each picture element being characterized by picture element data indicating a color of the picture element, to generate output words of picture element data for successive scan lines in the facsimile, comprising:
    decoding means, connected to receive the sequence of the variable length codes, for generating a first intermediate code in response to a variable length code;
    reference means, connected to receive picture element data from a reference scan line, for generating a color change signal indicating a position of a color change picture element in the reference scan line;
    control means, connected to receive and responsive to the first intermediate code and the color change signal, for generating a second intermediate code; and
    output generator means, connected to receive the second intermediate code, for generating output data words of picture element data.

9. The apparatus of claim 8, wherein the reference means includes:
   means, connected to receive picture element data from the reference scan line and responsive to a reference window control signal, for selecting a reference window of picture element data from the reference scan line; and
   color change detection means, connected to receive the picture element data in the reference window and a color change flag, for generating the color change signal indicating the position of a color change picture element identified by the color change flag in the reference window;
   wherein the control means generates the reference window control signal and the color chagne flag.

10. The apparatus of claim 9, further including:
   reference window control means, connected to receive the first intermediate code and the color change signal, for generating a beginning of window signal for the reference window;
   wherein the control means controls the reference window control means to supply the beginning of window signal as the reference window control signal.

11. The apparatus of claim 10, wherein the second intermediate code includes an output run length value and an output color flag and the control means includes:
   means, responsive to the first intermediate code, the color change signal and the beginning of window signal, for generating a plurality of run length values;
   selector means, connected to receive the plurality of run length values, for selecting one of the plurality of run length values as the output run length value; and
   state machine means, responsive to the first intermediate code, the color change signal and the beginning of window signal, for controlling the selector means and generating the output color flag.

12. The apparatus of claim 11, wherein the plurality of run length values includes a first value for use in a first mode, a second value for use in a second mode and a third value for use in a third mode, the first, second or third mode being identified by the first intermediate code.

13. The apparatus of claim 12, wherein the first intermediate code identifies a horizontal mode, a vertical mode or a pass mode as the first, second or third mode, respectively.

14. The apparatus of claim 8, wherein the sequence of variable length codes is supplied as fixed length input data words and the decoding means includes:
   code windowing means, connected to receive the input data words and responsive to a code window control signal, for selecting a coding window of data including a variable length code from the input data words, the coding window having a fixed length at least as long as the maximum length of the variable length codes;
   wherein the control means generates the code window control signal.

15. An apparatus for decoding input data words supplying a sequence of variable length codes specifying a facsimile of an image, the facsimile being represented by a plurality of scan lines, each scan line being represented by a plurality of picture elements and each picture element being characterized by picture element data indicating a color of the picture element, to generate output words of picture element data for successive scan lines in the facsimile, comprising:
   code windowing means, connected to receive the input data words and responsive to a code window control signal for selecting a coding window of data including a variable length code from the input data words, the coding window having a fixed length at least as long as the maximum length of the variable length codes;
   decoding means, connected to receive the data in the coding window, for generating a first intermediate code;
   reference windowing means, connected to receive picture element data from a reference scan line and responsive to a reference window control signal, for selecting a reference window of picture element data from the reference scan line;
   color change detection means, connected to receive the picture element data in the reference window and a color change flag, for generating a color change signal indicating the position of a color change picture element identified by the color change flag in the reference window;
   means, responsive to the first intermediate code, the color change signal and the reference window control signal, for generating a plurality of run length values;
   selector means, connected to receive the plurality of run length values, for selecting one of the plurality of run length values as an output run length value;
   state machine means, responsive to the first intermediate code, the color change signal and the reference window control signal, for controlling the selector means and generating the output color flag, the reference window control signal, the code window control signal and the color change flag; and
   output generator means, connected to receive the output run length value and the output color flag, for generating output data words of picture element data.

16. The apparatus of claim 15, further including:
   reference window control means, connected to receive the first intermediate code and the color change signal, for generating a beginning of window signal for the reference window;
   wherein the state machine means controls the reference window control means to supply the beginning of window signal to the reference windowing means and to the means for generating a plurality of run length values as the reference window control signal.

17. The apparatus of claim 15, wherein the decoding means includes means for generating a code length value indicating the length of a first variable length code in the coding window, and further including:
   code window control means, responsive to the code length value, for generating a code window shift signal;
   wherein the state machine means is responsive to the color change signal and the first intermediate code, for controlling the code window control means to supply the code window shift signal to the code windowing means as the code window control signal.

18. The apparatus of claim 15, wherein the plurality of run length values includes a first value for use in a first mode, a second value for use in a second mode and a third value for use in a third mode, the first, second or third mode being identified by the first intermediate code.

19. The apparatus of claim 18, wherein the first intermediate code identifies a horizontal mode, a vertical mode or a pass mode as the first, second or third modes, respectively.

* * * * *